United States Patent [19]

Thatcher

[11] 3,752,554

[45] Aug. 14, 1973

[54] METHOD OF MAKING A LASER TUBE SEAL

[76] Inventor: John B. Thatcher, 1295 Forgewood Dr., Sunnyvale, Calif.

[22] Filed: June 4, 1970

(Under Rule 47)

[21] Appl. No.: 43,321

[52] U.S. Cl. .................. 316/19, 316/23, 29/25.13
[51] Int. Cl. .............................................. H01j 9/18
[58] Field of Search .................. 29/25.13, 25.15, 29/25.16, 25.1, 25.11; 316/19, 23, 29; 331/94.5

[56] References Cited
UNITED STATES PATENTS

| 2,514,878 | 7/1950 | Kuperus | 29/25.13 X |
| 2,671,746 | 3/1954 | Brew | 29/DIG. 22 |
| 2,756,892 | 7/1956 | Bleuze et al. | 316/19 X |
| 2,957,236 | 10/1960 | Kreuchen | 29/470.1 |
| 3,095,251 | 6/1963 | Slark | 316/19 |
| 3,528,028 | 9/1970 | Baird | 331/94.5 |
| 3,566,302 | 2/1971 | Rhodes | 331/94.5 |
| 3,575,671 | 4/1971 | Dessus et al. | 331/94.5 |

Primary Examiner—John F. Campbell
Assistant Examiner—Richard Bernard Lazarus
Attorney—Townsend and Townsend

[57] ABSTRACT

A method for applying members such as windows and resonator mirrors to ends of a laser tube in which the member is first rough aligned and sealed to the tube. After the installation of the laser tube in its permanent supporting structure, the member is fine aligned with respect to the tube and fixed in that position for the subsequent operation and lasing of the laser.

5 Claims, 5 Drawing Figures

PATENTED AUG 14 1973 3,752,554
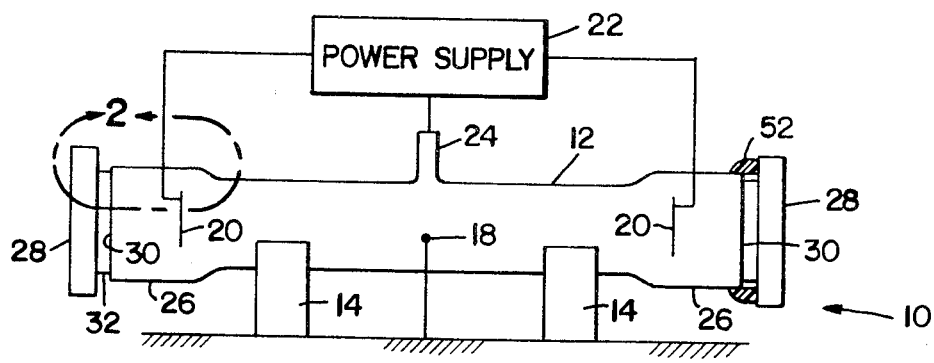
FIG_1
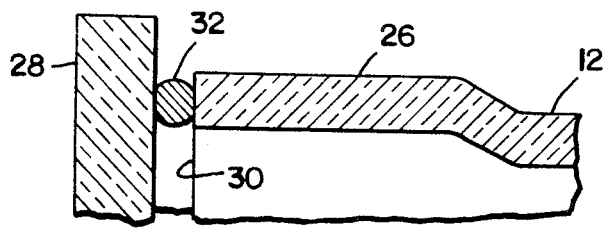
FIG_2
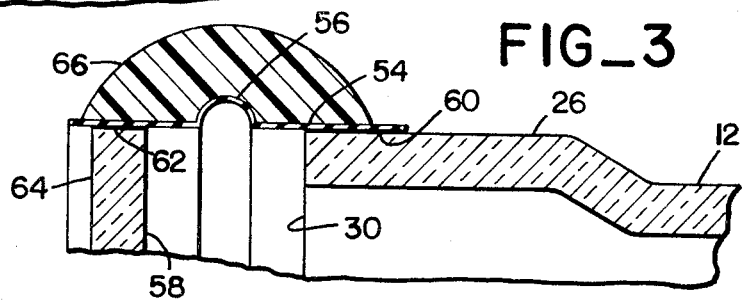
FIG_3
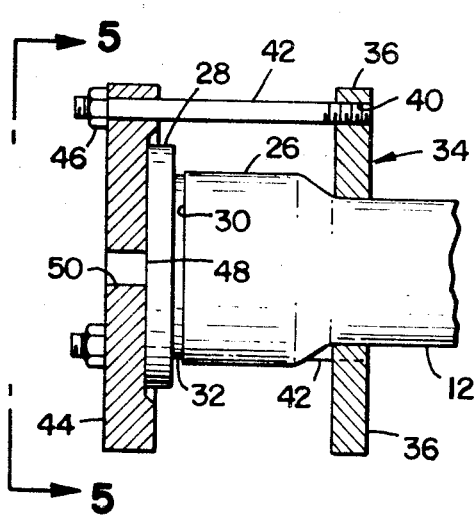
FIG_4
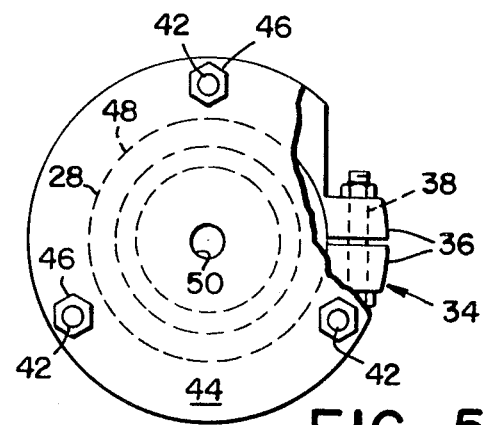
FIG_5
INVENTOR.
JOHN THATCHER
BY
Townsend and Townsend
ATTORNEYS

METHOD OF MAKING A LASER TUBE SEAL

BACKGROUND OF THE INVENTION

The present invention relates to vacuum discharge lasers and more particularly to a new method and structure for sealing and positioning windows and resonator mirrors to ends of laser tubes.

Gas lasers typically comprise an elongated hollow glass tube sealed at both ends and filled with a gas mixture, such as a mixture of neon and helium gases, at relatively low pressures of between about one to about three millimeter mercury (mm Hg). Resonator mirrors are provided to reflect a major portion of the incident radiation and to transmit a minor portion of this radiation in the form of a laser beam. Although it has been recognized in the past that the mirrors can be positioned inside or outside of the tube, or that they may even be employed to seal the ends of the tubes, practical considerations have required that the mirrors be positioned outside the tube so that they can be exactly aligned with the axis of the tube. Alignment of the mirrors is extremely critical, a deviation of a few arc seconds being sufficient to significantly reduce the power output of the laser or to prevent lasing altogether.

The seal between the resonator mirrors or windows and the ends of the laser tubes must hermetically seal the interior of the tube and, further, must prevent the release of gaseous impurities into the tube. Such a contamination of the gas mixture in the tube may take place during the original processing or forming of the seal or the seal may gradually release impurities through leakage or evaporation of the sealant material into the interior of the tube.

In the past, several attempts have been made to provide adequate seals for gas laser tubes. Generally, the end surfaces of the laser tube were precision ground, an end plate was placed in direct contact with the ground end surfaces of the tube, and the end plate was affixed to the tube as, for example, with a bonding agent.

Even if the tube end surfaces are precision ground when the tube is placed on its permanent support, such as an optical bench defined by the laser instrument, the weight of the tube causes a deflection thereof which is sufficient to misalign the resonator mirror with respect to the axis of the tube. Thus, the mirror must be aligned with the laser tube axis after the tube has been installed in the instrument.

Prior art lasers generally position resonator mirrors outside, i.e., independent of, the laser tube. There the position of the mirrors can be adjusted after the tube has been installed in the instrument to obtain a maximum power output from the laser beam. In the prior art laser tubes are sealed with so-called "windows" which are mounted to the tubes at Brewster's angle (the angle of incidence at which a wave polarized normal to the plane of incidence is wholly transmitted without reflection). Losses from imperfections in the positioning of the windows as well as transmission losses reduce the efficiency of the laser.

SUMMARY OF THE INVENTION

The present invention provides a method in accordance with which members, such as windows or resonator mirrors, can be applied to ends of a laser tube, to hermetically seal the interior of the tube while permitting fine adjustments of the position of the member after the instrument has been placed on its final support structure and while the instrument is in operation. Briefly, the method comprises the steps of positioning the member adjacent the end of the tube, rough aligning it with the tube, and placing sealing means between the member and the end of the tube. The rough aligned member is secured to the tube while its rough aligned position is maintained. The tube is then placed on its permanent support structure and the member is fine aligned while the seal is maintained.

In one embodiment of this invention, a flexible sleeve is secured to the exterior of the laser tube and extends past the end thereof and, on its interior, mounts the resonator mirror (or window) in a hermetically sealed fashion. After the tube has been installed in the instrument, it is energized and the angular position of the mirror is adjusted until the power output of the emitted laser beam is maximized. The resonator mirror is then mechanically interconnected with the end of the tube such as, for example, by applying a bead of a curable epoxy around the exterior of the sleeve.

In another embodiment of this invention, an annular seal ring is placed intermediate the end of the tube and the resonator mirror and is compressed while the mirror is rough aligned. This permits the subsequent operation of the laser.

The seal ring is constructed of a flow vapor pressure material to prevent evaporation of the material and a resulting contamination of the gas mixture in the tube. The seal ring is further constructed of a material having a lesser hardness than the hardness of the mirror and the tube to permit its compression.

The ring hermetically seals the tube interior from the exterior. Since the tube is evacuated, atmospheric pressure biases the mirror toward the seal ring and the tube end and thereby retains the mirror on the tube. Mechanical means interlocking the mirror with the laser tube may be provided to prevent the mirror from being accidentally shaken loose from the tube.

This invention substantially reduces manufacturing cost for lasers. First, the position of the tube end faces is no longer critical as in the past since the mirror (or window) is spaced from and no longer positioned by them. Secondly, the danger of contamination of the gaseous interior of the tube is substantially reduced or eliminated by the use of low vapor pressure materials. Thirdly, it is possible to adjust the angular position of the resonator mirror after the filling of the tube with the operating gas mixture even though the resonator mirror is hermetically sealed to the tube. Thus, the mirror can be directly secured to the tube and the use of an intermediate sealing window, which must also be positioned with a high degree of accuracy, is eliminated.

BRIEF DESCRIPTION OF THE DRAWINGS

FIG. 1 is a front elevational, schematic view of a laser tube mounted on a support structure and constructed in accordance with the present invention;

FIG. 2 is an enlarged, fragmentary view of the end of the laser tube indicated by line 2 of FIG. 2;

FIG. 3 is a view similar to FIG. 2 and shows another embodiment of the present invention;

FIG. 4 is a fragmentary plan view of an end of a laser tube and illustrates a resonator mirror adjustment fixture as used in the practice of the method of the present invention; and FIG. 5 is a side elevational view, with parts broken away, taken on line 5—5 of FIG. 4.

DESCRIPTION OF THE PREFERRED EMBODIMENTS

Referring to FIG. 1, a laser 10 generally comprises a vacuum or discharge tube 12 mounted on an optical bench 14 of a permanent laser support structure 16. A cathode 18 disposed interiorly of the tube is connected to ground and the tube may be provided with one or two anodes 20 spaced from the cathode and electrically coupled with a power supply 22. The tube includes a port 24 through which the gas mixture is introduced and which is sealed thereafter. The tube has a circular cross section and includes enlarged diameter neck portions 26 defining ends of the tube. Flat plate members 28, which may comprise windows or frequency selective resonator mirrors for the laser, are spaced from flat end surfaces 30 of the tube and are hermetically sealed therewith as more fully set forth below. The end surfaces are preferably polished to increase the quality of the seal.

Referring to FIGS. 1 and 2, one embodiment of the invention employs an annular seal ring 32 having a circular cross section and which is disposed between the end surface of the tube and the adjacent resonator mirror. The seal ring is constructed of a material having a low vapor pressure to prevent evaporation of the sealing material into the interior of the laser tube and the resulting contamination of the gas mixture in the tube. As used in this specification, a low vapor pressure means a vapor pressure of less than about $10^{-8}$ mm. Hg. The material must further have a hardness which is less than the hardness of the material of which member 28, i.e., the resonator mirror, and the laser tube are constructed. Generally, the laser tube and the resonator mirror are constructed of glass and the hardness of the seal ring material must, therefore, be less than the hardness of glass.

A presently preferred material for the seal ring is indium, which has a lesser hardness than that of glass and which has a vapor pressure of about $10^{-11}$ mm. Hg. Contamination of the low pressure (between about one to about three mm. Hg) gas mixture in the laser tube from evaporation of the seal ring material is thereby practically eliminated. Another preferred material for the construction of the seal rings is silver chloride (HgCl) which satisfies all the requirements.

Referring to FIGS. 2, 4, and 5, the resonator mirror is mounted and sealed to the ends of the laser tube as follows. A harness 34 comprising a pair of semicircular, ring-shaped members 36 is placed over the laser tube inward of the enlarged diameter neck portions 26 and the two halves are conventionally secured to each other as by bolts 38. The harness includes three equally spaced, tapped bores 40 which mount three elongated bolts 42 and which are engaged by a pressure plate 44 and retained thereon by nuts 46. The pressure plate includes a recessed face 48 which engages the outer surface of resonator mirror 28.

The nuts are tightened to apply a force to and thereby compress seal ring 32 disposed between end surfaces 30 of the laser tube and the side of the mirror facing the tube. A sufficient force is applied to the seal ring to seal the interior of the tube from the exterior. The forces applied to the bolts can be varied to unequally compress the seal ring and thereby to rough align the mirror with the axis of the tube.

It will be noted that the resonator mirror remains spaced from end surfaces 30 to permit a subsequent compression and fine alignment of the mirror with the axis of the tube.

Next, air from the laser tube is evacuated and the gas mixture is introduced through port 24. Port 24 is sealed, the laser tube with harnesses 34 and pressure plates 44 mounted thereon is placed on optical bench 14 of instrument support structure 16, cathode 18 and anodes 20 are electrically connected with ground and power supply 22, respectively, and the laser is energized. A laser beam passes through resonator mirror 28 and a central aperture 50 in pressure plate 44.

The intensity or power output of the laser beam is now conventionally measured and seal rings 32 are further compressed by tightening one or more of the nuts 46 to change the angularity of the mirrors with respect to the axis of the tube (and the laser beam) until the measured power output of the beam is maximized. Thus, the selective tightening of one or more of the bolts unequally compresses the seal ring, i.e., compresses portions of it more and others less until the correct and exact angularity of the mirror is attained. Thereafter, harness 34 and pressure plate 44 are removed from the laser.

Atmospheric pressure acting on the exterior of the resonator mirror biases the latter toward the laser tube and is sufficient to maintain the mirror in place. To prevent movement of the accurately positioned resonator mirror from accidental impacts thereon, mechanical means, such as a bead of a cured epoxy or bonding agent 52 (shown in FIG. 1) interconnecting the end of the laser tube with the resonator mirror, may be provided. Other means, such as clamps or holding fixtures (not shown) can be substituted. The forces applied to the resonator mirrors from the pressure differential between the interior and the exterior of the laser tube are, however, sufficient for all generally encountered laser applications.

The resonator mirror is exactly aligned with the axis of the laser tube after the tube has been evacuated and filled with a low pressure gas mixture. The tube can be installed in the instrument in which it is to be used before the final alignment of the mirrors. Deflections of the tube from its weight and/or from the shape, position and alignment of its support or optical bench are now taken into account when the mirrors are aligned and positioned even though they are mounted to the tube. A further advantage derived from the method of the present invention is that the mirror position can be readjusted should the tube be used in different instruments if no or an adjustable mechanical interconnection between the laser tube and the mirror is provided. This is of particular convenience for lasers used in scientific laboratories. There they can be used for experiments which may require a different support and housing for the laser tube.

Referring to FIG. 3, another embodiment of the present invention provides a tubular sleeve 54 fitting snugly over the exterior of the enlarged diameter neck portion 26 of vacuum tube 12 and extending outwardly therefrom. The sleeve may include a bellows 56, or may be cylindrical over its full length (not shown), fits snugly over resonator mirror 58 and mounts the mirror adjacent the other end of the sleeve. A thin layer 60 of a bonding agent between the exterior of the enlarged diameter neck portion of the tube and the interior of the sleeve retains the sleeve to the laser tube. A thin layer 62 of a bonding agent is applied between the circumference of mirror 58 and the interior of the sleeve and secures the mirror to the sleeve.

Most commonly available bonding agents have a vapor pressure greater than $10^{-8}$ mm. Hg. Ordinarily, there would be a danger of contamination of the interior of the laser tube from layers 60 and 62 of the bonding agent. To prevent such a contamination layers 60 and 62 comprise very thin films of the bonding agent. The actual contact area between the gas mixture in the laser tube and the bonding agent thereby becomes very small. The bonding agent then evaporates at such a slow rate that the contamination of the gas mixture becomes negligible and does not affect the operation of the laser.

The laser tube, sleeve and resonator mirrors are assembled by first slipping the sleeve over the ends of the tube and bonding the former to the latter. A layer of a bonding agent is then applied to the periphery of the mirror and the mirror is inserted into the sleeve and rough aligned with the axis of the laser tube. Thereafter, the laser tube is evacuated and filled with the gas mixture as described above, placed on the optical bench (not shown in FIG. 3) of the instrument and electrically connected with the power supply (not shown in FIG. 3). A positioning fixture (not shown in FIG. 3) operating similarly to the fixture illustrated in FIGS. 4 and 5 and engaging the side 64 of mirror 58 facing away from the laser tube is mounted onto the laser tube. The laser is energized so that a beam exits through the mirror and the fixture is adjusted to exactly align the mirror with the axis of the tube and the laser beam by again measuring the power output of the laser beam and positioning the mirror to maximize that output. The fixture retains the mirror in that position and a bead 66 of a hardening material, such as a curable resin, is applied to the exterior of the sleeve. The resin bead extends from adjacent the periphery of the mirror to past end surface 30 of the laser tube and, when cured, mechanically interconnects the laser tube with the mirror. Although the bead may contract during its curing, the contraction is equal throughout the periphery of the sleeve so that the angular position of the mirror with respect to the axis of the laser tube remains constant.

While one embodiment of this invention has been shown and described, it will be apparent that other adaptations and modifications can be made without departing from the true spirit and scope of the invention.

I claim:

1. A method for mounting flat resonator mirrors to flat ends of gas laser tubes comprising the steps of placing a unitary seal ring constructed of a malleable, homogeneous, solid, low vapor pressure material adjacent an end face of the laser tube, contacting the seal ring with the vacuum tube and the reflective surface of the resonator mirror so that the seal ring spaces the mirror and the adjacent flat end of the gas laser tube apart, applying a sufficient force to the mirror and the tube to partially and permanently deform the seal ring while maintaining a spacing between the mirror and the adjacent flat end of the gas laser tube and to hermetically seal the laser tube interior from the exterior, and subsequently evacuating the interior of the laser tube to a pressure so that atmospheric pressure biases the resonator mirror towards the tube into firm engagement with the seal ring without further deforming the seal ring to thereby secure the resonator mirror to the laser tube.

2. A method according to claim 1 including the further step of applying an eccentric compressive force to the resonator mirror while maintaining the vacuum in the tube to deform the seal ring unequally over its circumference until the resonator mirror is optically aligned with the laser tube axis.

3. A method according to claim 2 including the step of rigidly interconnecting the resonator mirror with the laser tube after completion of the steps set forth in claim 2 to prevent the accidental movement of the high precision positioned resonator mirrors by excessive exterior forces.

4. A method for hermetically sealing resonator mirrors to ends of laser tubes comprising the steps of sealing the resonator mirror to an end of an elongate, tubular, yieldable sleeve, sealing the other end of the sleeve to an end portion of the laser tube, evacuating the interior of the laser tube, then optically aligning the resonator mirror with the axis of the laser tube, wherein the sleeve is constructed of a flexible material, the resonator mirror is disposed on the interior of the sleeve, and the other end of the sleeve slips over the end portion of the laser tube, wherein the steps of mechanically interconnecting comprises the step of applying a curable agent to the exterior of the sleeve between the portion of the sleeve disposed over the periphery of the resonator mirror and the portion of the sleeve slipped over the end portion of the laser tube.

5. A method for hermetically sealing flat ends of a vacuum tube with a flat plate member requiring substantially exact positioning of the member with respect to the axis of the tube, the method comprising the steps of forming an annular yieldable connection and seal between the plate member and a flat end surface of the tube which spaces and supports the member a substantial distance from the surface, forming a vacuum on the interior of the tube to thereby retain the member to the surface, placing the tube on its permanent support structure, optically aligning the plate member with the axis of the tube by deforming the yieldable connection between the plate member and the end portion of the tube unequally over its circumference while maintaining all parts of the member spaced from the surface, wherein the step of forming the annular yieldable connection and seal comprises the steps of placing a flexible, tubular sleeve over the exterior of an end portion of the tube, the sleeve projecting past the end of the tube, placing the plate member on the interior of the sleeve in spaced relation to the surface, and sealing the member with the sleeve, and securing and sealing the sleeve with the end portion of the tube while maintaining the plate member in a spaced relation to the surface of the tube.

* * * * *